United States Patent [19]
Harms et al.

[11] Patent Number: 6,070,470
[45] Date of Patent: Jun. 6, 2000

[54] SENSOR FOR MEASURING THE INTERNAL PRESSURE OF HOLLOW BODIES

[75] Inventors: Klaus-Christoph Harms, Graz; Paul Kirschbaum, Seiersberg; Josef Glaser, Graz, all of Austria

[73] Assignee: AVL List GmbH, Austria

[21] Appl. No.: 09/033,601

[22] Filed: Mar. 3, 1998

[30] Foreign Application Priority Data

Mar. 7, 1997 [AT] Austria ................................ GM 146/97

[51] Int. Cl.⁷ .................................. G01L 7/02; A41F 1/00
[52] U.S. Cl. ................................................ 73/730; 24/513
[58] Field of Search ............................. 73/831, 833, 856, 73/857, 730; 70/19; 24/19, 513, 502, 270; 81/9.3

[56] References Cited

U.S. PATENT DOCUMENTS

| | | | |
|---|---|---|---|
| 4,194,401 | 3/1980 | Claassen et al. ........................ | 73/730 |
| 4,391,147 | 7/1983 | Krempl et al. .......................... | 73/730 |
| 4,573,717 | 3/1986 | Peacock ................................... | 285/365 |
| 5,322,301 | 6/1994 | Pohl ........................................ | 279/4.06 |
| 5,575,632 | 11/1996 | Morris et al. ........................... | 417/477.2 |

*Primary Examiner*—Benjamin R. Fuller
*Assistant Examiner*—Abdullahi Aw-Musse
*Attorney, Agent, or Firm*—Hill & Simpson

[57] ABSTRACT

A sensor used especially for the measurement of the internal pressure of injection lines of diesel engines comprises two housing parts which are connected via an articulation and can be clamped to the line with a tension device. For simple and in particular one-handed attachment of the sensor in every state of opening or closing, the tension device is located in the same sector, facing the articulation, on one side of the external region of the tube. The connecting plug for the discharging of the measuring signals is preferably insertible in the correspondingly fashioned articulation and can be locked there.

22 Claims, 3 Drawing Sheets

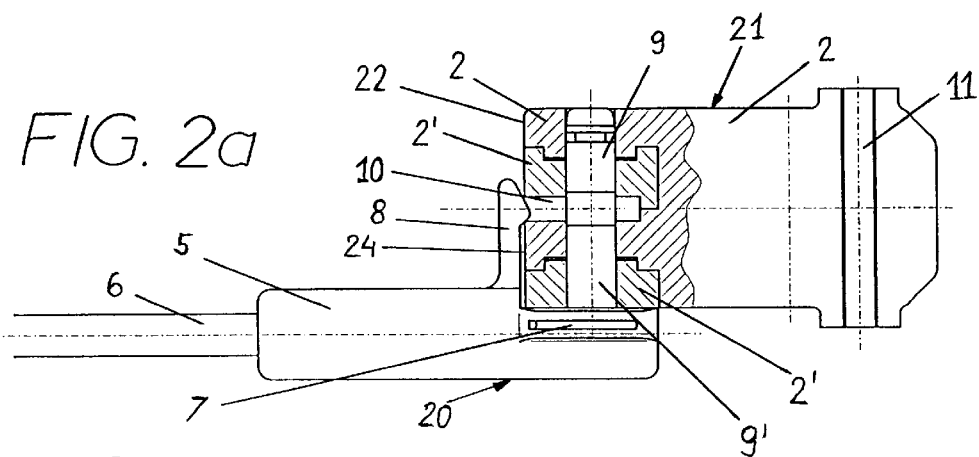
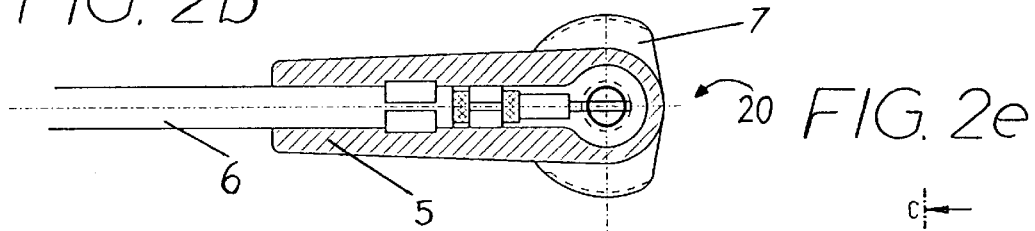
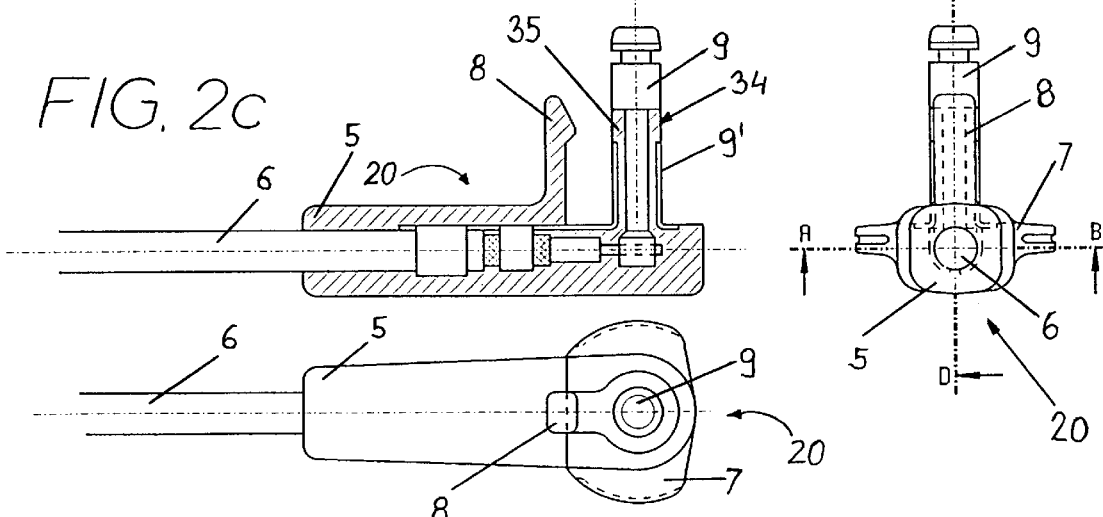

SENSOR FOR MEASURING THE INTERNAL PRESSURE OF HOLLOW BODIES

FIELD OF THE INVENTION

The present invention relates to a sensor for measuring the internal pressure of hollow bodies. More specifically, the present invention relates to sensors for measuring the internal pressure of injection lines of diesel internal combustion engines.

BACKGROUND OF THE INVENTION

Internal pressure sensors having a housing with at least two pivotally connected housing parts that are placed around a hollow body and that include a tension device acting on one of the housing parts are known. Such a sensor contains at least one electrical measuring element pressed elastically onto the surface of the hollow body when the tension device or housing is placed in a closed position.

Such sensors are used above all in the testing and diagnosis of diesel engines with a conventional injection system, for example. These internal combustion engines often do not possess electrical means with which it would be possible to determine quickly and simply the engine speed, beginning of conveyance of fuel, and the injection pressure curve, all of which are important for the recognition of errors in the injection system, which often result in impermissibly bad exhaust values. Thus, a need exists for cost-effective, rugged and sufficiently precise sensors which can be attached quickly and simply to the internal combustion engine and which allow such measurements.

Sensors suited in principle to this object and having various features have become known from the following references, for example: AT-PS 375.466, AT-PS 353.507, AT-PS 373.393, AT-PS 373.394, AT-PS 374.007, AT-PS 374.280. DE 40 02 790 C2, which also makes reference to a few of the abovementioned documents, has also become known.

It is common to all of these known sensors that they are relatively expensive, due to their construction and the parts used. But above all, the application of these sensors is fraught with difficulties, since the space relations for attaching the sensor to the injection line are extremely tight, and the known tension device is relatively large, often requiring two hands for operation.

It is the object of the invention to avoid the cited disadvantages of the known sensors and to provide a sensor of the type mentioned at the outset, which can be operated simply and with one hand, is rugged, and above all, is cost-effective due to its construction, despite retaining good measuring characteristics.

SUMMARY OF THE INVENTION

The above object is inventively achieved, in that the tension device—in reference to the hollow body—acts on the two housing parts from the side of the articulated or pivotal connection of these two parts and connects the two housing parts in the open state in addition to the articulated or pivotal connection. Since, in any state of opening or closing, the tension device is thus located in a sector of the tube exterior facing the pivotal connection, it is achieved that the sensor, which is opened like a pair of jaws, can be pushed or pulled over the tube from the side, with only one hand, if necessary. Therefore, a complete clasping around of the tube by the sensor with tension device, as was previously required, is not necessary. Rather, a simple closing by pressure of the two sensor halves and the tension device instead suffices (with two fingers, for example).

Since the tension device connects the two housing parts even in the open state, the engaging of a released connection of the tension device with the housing is omitted in the clamping on of the sensor. All the connections of the sensor also remain joined in the open state also, which significantly simplifies the operation.

According to a preferred embodiment of the invention wherein the tension device comprises a clamping lever and a tension spring, it is provided that the clamping lever is attached in an articulated or pivotal fashion at the side of the one housing part across from the articulation or pivotal connection of the two housing parts. The tension spring is also attached in an articulated or pivotal fashion at the side of the other housing part across from the articulation or pivotal connection of the two housing parts. The tension spring is attached in an articulated fashion at the clamping lever. This results in a simple tension device of few parts, durably and reliably joined, and of small construction which can be operated easily with one hand.

According to an embodiment of the invention which especially lowers the production costs, it is provided that the articulated bearing of the clamping lever in one of the housing parts and of the tension spring in the other housing part is provided. Parts of the tension device are snapped into depressions provided therefor in the housing parts and further which function as axles or pivot pins. Thus, some of the parts and production steps necessary for bearing in bore holes are omitted, and the assembly can be carried out in a fast and cost-effective manner.

It can be further inventively provided that, in opening, the clamping lever is moved in the direction of the opening motion, and in closing, in the direction of the closing motion of the two housing parts, which open, or respectively, close in a manner similar to jaws. These features result in an operation which appears more logical to human thought and action, which moreover avoids the exertion of unfavorable torsional forces on the sensor during operation.

In a sensor with a bipolar discharge of the measuring signal, the communication of the measuring signal can comprise two subcommunications, each of which is allocated to one of the two electrical signal discharges from both sensor halves, and which are separated from each other by an air gap effecting a good electrical insulation.

It is known in the physical sensors art to integrate metal parts into the housing parts for conductive discharge. This preferably occurs, for example, by placing these in an injection mold and coating them with synthetic and insulating material, such as plastic. It is further known to produce the electrical connection between the two sensor halves in the articulation, for example. It is essential, however, that not only one, but two electrical connections are produced in the physical bipolar embodiment, and that these must be very well insulated from each other electrically. Especially in the preferred embodiments with piezoelectric measuring elements, attention must be given to a high degree of insulation between the two poles. This can be inventively achieved by the division of the signal into two subcommunications, one for each pole, which are set at a distance from each other. The air and the relatively large surface path assures the insulation. And in the event that, for example, drops of condensation water occur in the area of the articulation, these can dry in the air and no longer endanger the insulation.

In a further embodiment of the invention, with a bipolar plug connection for the connection of a cable, it can be inventively provided that the two subarticulations are designed as a socket for an electrical plug contact and that a bipolar plug designed in the manner of a jack plug and connected to the sensor cable produces, on the one hand, the electrical connection of the two sensor halves with each other and with the cable, and on the other hand, as a plug axle in the articulation, absorbs the mechanical forces arising in the clamped-on state. Electrical connections of the sensor halves with each other and with the cable which are designed as a plug axle are in fact known per se, but the specific embodiment not as a plug axis arranged securely in the sensor, but rather as an insertible and extractable jack-plug whose contact surfaces produce the electrical connection to the contact surfaces of the two sensor halves, these latter contact surfaces being arranged in the subarticulations, is new and particularly advantageous. The relatively large distance between the subarticulations, which also allows a wide insulation zone between the two contact surfaces of the jack plug, thus assuring the required good insulation, is also advantageous.

According to another embodiment of the invention, it is provided that the plug comprises a projecting lock in the fashion of a snap bolt which snaps into the gap between the two subarticulations. There result therefrom the two significant advantages that the plug remains locked in the mechanically unloaded unstressed state (i.e. when the sensor is not clamped on the line) and cannot easily detach from the sensor, and that a sectorial limitation of the possible twisting or torsion of plug and cable is given, preventing a rotation and thus impermissible twisting or kinking of the cable.

As a further measure for locking the plug, it can be inventively provided that the plug comprises a disk-like and largely cross-shaped widening which is located at its cable terminal portion and arranged perpendicularly to the plug axis and for which, in the open state, the tension spring of the tension device represents a locking against the extraction of the plug. This measure has proven quite advantageous, since an undesired detachment of the sensor from the cable is thereby practically excluded. In the clamped-on state, the clamping forces prevent the plug from detaching from the sensor, even with the vibrations of the injection line, which can be severe. In the open state, the tension spring effects a locking of the plug. And in the event that the plug is to be intentionally extracted, the sensor can be closed without the tube and thus without significant clamping forces, so that the tension spring releases the plug, which can then be extracted. In contrast thereto, the disk-shaped lock can however also be designed so that the plug can be withdrawn only in the clamping lever's closed state and in a particular rotational position.

Beyond this, it can be provided in another development of the invention that the plug is a right angle plug and that the disk-like widening of the plug comprises a recess, preferably in the direction of the continued cable axis, so that no locking ensues in the corresponding rotational position of the plug relative to the sensor. This is advantageous, since, on the one hand, the axial tensile forces from the cable cannot effect an extraction of the plug given a right angle plug. On the other hand, the recess assures that an extraction of the plug is possible even in the event of critical tolerances between plug disk and tension spring, as can arise in production or with a possible bent spring. It is therein advantageous, that the rotational position of the plug relative to the sensor provided for the extraction of the plug arises relatively infrequently in practical use. The cable axle mostly stands at an angle to the sensor axle, and the tension spring can prevent an undesired extraction in the open state of the sensor.

In an especially preferred embodiment of the invention it is provided that guide elements in the form of mutually fitting projections and depressions that basically permit only the articulation motion are provided at the articulation or joint. These projections and depressions maintain a radial positioning of the two housing parts, as well as an axial positioning of these parts acting to both sides, even when the plug is extracted. This auxiliary articulation is of great advantage, as it prevents the two sensor halves in the articulation from collapsing when the plug is extracted. It can comprise a relatively large radial play, since it has to bear practically no mechanical load in the clamped-on state of the sensor. The result is a less difficult and therefore cost-effective production, as well as the avoidance of difficulties with the double-fits resulting from the two subarticulations together with the auxiliary articulation. The guide elements forming the auxiliary articulation are connected with the housing parts in one piece and are basically characterized by the interior and exterior surfaces as well as the end-faces of cylindrical projections and recessions, in the fashion of journals and bores. It is also essential that the insulating air-gap between the subarticulations is not adversely affected by the formation of the auxiliary articulation.

In a further embodiment of the invention it is provided that the guide elements representing the auxiliary articulation comprise recessed areas which enable a joining or separating of the two housing parts in the completely open state. The auxiliary articulation can in fact also be designed so that a joining can ensue by snapping during the assembly of the sensor. However, it has turned out to be especially advantageous that the guide elements of the auxiliary articulation are designed to be stronger than in a clip connection, and that they comprise recesses for joining during assembly of the sensor which allow the two housing parts to be put together in the completely open state. With the subsequent rotation of the two housing parts about the articulation axle, i.e. with the closing of the sensor, the unrecessed parts of the guide elements join to form an auxiliary articulation. Of course, attention must be given that in the normal case the tension device prevents the complete folding open of the sensor halves. However, in the assembly of the sensor, the assembly of the tension device can ensue after the joining of the auxiliary articulation, and in the event of repair the tension device must be detached in at least one place in order to be able to completely fold open the sensor halves and loosen the auxiliary articulation. Of course, the plug must therein always be extracted.

In an embodiment, the sensor of the present invention comprises a housing comprising a first housing part and a second housing part. The first and second housing parts each comprise a proximate end and a distal end. The proximate ends of the first and second housing parts being pivotally connected together. The distal end of the first housing part is pivotally engaged by a clamp lever. The clamp lever is connected to a curved tension spring having a first end connected to the clamp lever and a second end that pivotally engages the distal end of the second housing part. The curved tension spring further includes a middle portion that curves towards the pivotally connected proximate ends of the first and second housing parts.

The first and second housing parts each comprising inside surfaces that accommodate at least one electric measuring element. The inside surfaces of the first and second housing parts are disposed between the middle portion of the tension spring and the distal ends of the first and second housing parts. Accordingly, the hollow body may be inserted between the inside surfaces of the first and second housing parts when the housing is in an open position without interference from the middle portion of the tension spring.

The housing is pivotable to an open position with the inside surfaces of the first and second housing parts being sufficiently separated so as to permit insertion of the hollow body therebetween and the housing is further pivotal to a closed position with the electric measuring element pressed elastically against the surface of the hollow body upon pivotal movement of the clamp lever towards the distal end of the second housing part.

In an embodiment, the clamp lever comprises a pivot pin and the first housing part comprises a recess for resiliently accommodating the pivot pin.

In an embodiment, the clamping lever further comprises a first end that pivotally engages the first housing part in a second end. In the open position, the distal end of the first housing part is disposed between the second end of the clamp lever and the distal end of the second housing part. In contrast, in the closed position, the second end of the clamping lever is disposed between the distal ends of the first and second housing parts.

In an embodiment, both the first and second housing parts accommodate an electric measuring element so that the sensor provides a bipolar discharge of measuring signals.

In an embodiment, the first and second measuring elements are separated from each other by an air gap.

In an embodiment, the sensor further comprises a bipolar plug connection for connecting a cable to the first and second electric measuring elements. The bipolar plug connection comprises a plug axle having a first contact area for pivotally engaging the first electric measuring element and a second contact area for pivotally engaging the second electric measuring element. The first and second contact areas are spaced apart and separated by insulation. The plug axle provides the pivotal connection between the first and second housing parts and further provides the pivotal connection between the bipolar plug connection and the first and second housing parts.

In an embodiment, the bipolar plug connection further comprises a projecting lock for securing the bipolar plug connection to the first and second housing parts.

In an embodiment, the projecting lock comprises a distal end having a bead. The bead is resiliently received in a gap disposed between the proximate ends of the first and second housing parts.

In an embodiment, the bipolar plug connection further comprises a disc-shaped lock member. The disc-shaped lock member is trapped under the middle portion of the tension spring when the sensor is in an open position.

In an embodiment, the disc-shaped lock member engages the middle portion of the tension spring if the bipolar plug connection is rotated when the sensor is in the closed position.

In an embodiment, the first and second housing parts remain connected in the event the bipolar plug connection is detached from the first and second housing parts.

Other objects and advantages of the present invention will become apparent from reading the following detailed description and appended claims, and upon reference to the accompanying drawings.

BRIEF DESCRIPTION OF THE DRAWING

A preferred embodiment of the invention is described using the figures as follows:

FIG. 2a illustrates a top sectional view of the plug connection and clamp of the sensor shown in FIG. 1.

FIG. 2b is a sectional view taken substantially along line A–B of FIG. 2e.

FIG. 2c is a sectional view taken substantially along line C–D of FIG. 2e.

FIG. 2d is a top plan view of the plug connection of the sensor shown in FIG. 1.

FIG. 2e is an end view of the plug connection of the sensor shown in FIG. 1.

FIG. 3b is an expanded partial view of the housing part shown in FIG. 3a.

FIG. 3c is a plan view of the housing part shown in FIG. 3a.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figures 1A, 1B:
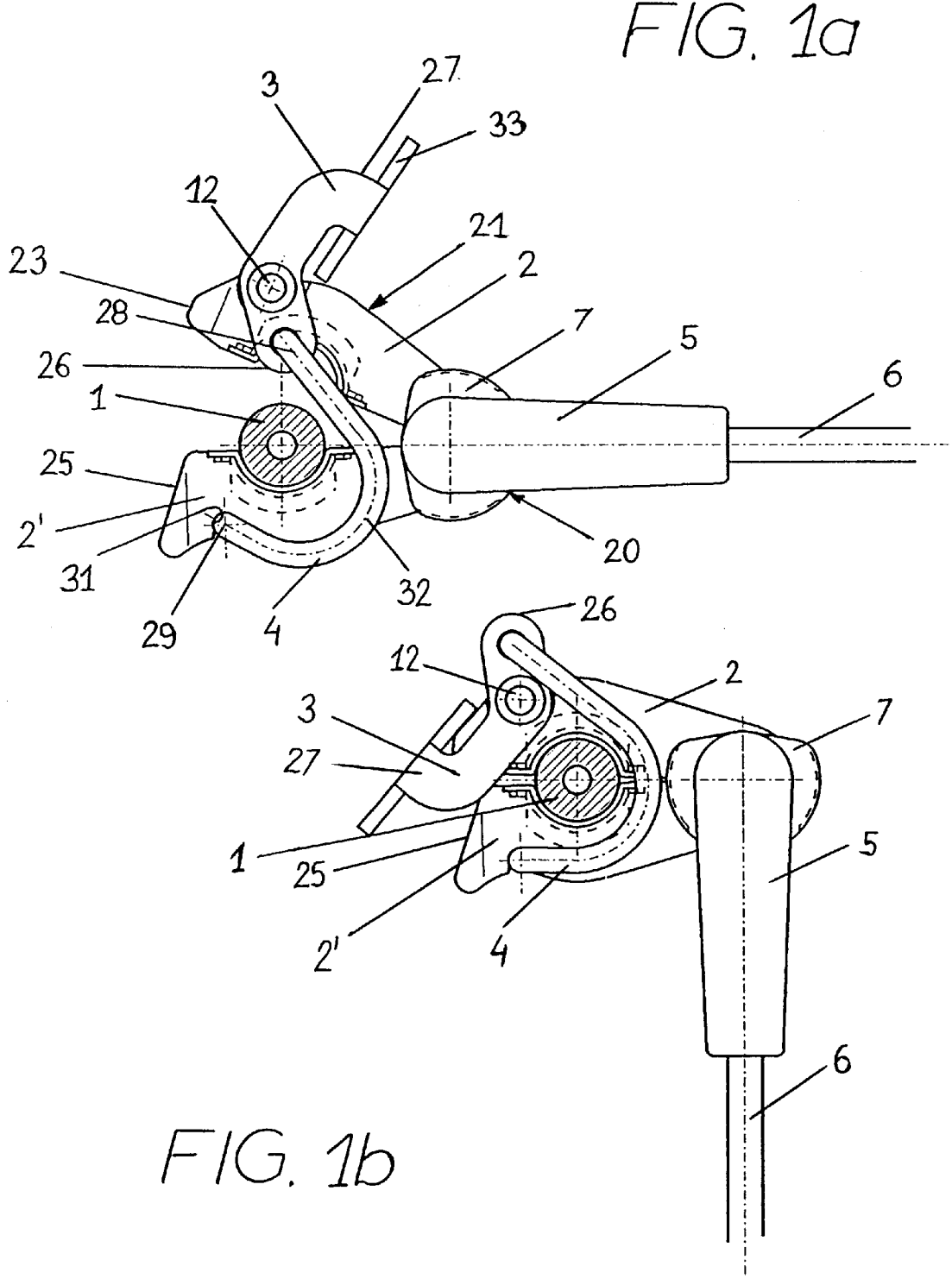
FIG. 1a illustrates a side view of an embodiment of a sensor of the present invention with plug and cable terminal in open position.
FIG. 1b illustrates the sensor shown in FIG. 1a in the closed position.

FIG. 1 illustrates an injection line 1, a clamping lever 3 which is attached to a first housing part 2 in an articulated or pivotal manner, and a tension spring 4 which is attached to a second housing part 2' in an articulated or pivotal manner, whereby the tension device 3, 4 in both of the positions depicted in FIGS. 1a and 1b is located essentially on the same side of the tube 1 and connects the two housing parts 2, 2' in an articulated or pivotal manner. A plug 20 configured as a right angle plug with a cable terminal 5 for a cable 6 and with the stop plate or lock plate 7 is inserted into the socket 21 (see FIG. 2c).

For purposes of clarity, it will be noted that the first housing part 2 has a proximate end 22 (see FIG. 2a) and a distal end 23 (see FIG. 1a). Similarly, the second housing part 2' also includes a proximate end 24 (see FIG. 2a) and a distal end 25 (see FIG. 1a). The clamp lever 3 is attached to the distal end 23 of the first housing part 2. The clamp lever 3 includes a first end 26 and a second end 27. The first end 26 of the clamp lever 3 is connected to a first end 28 of the tension spring 4. A second end 29 of the tension spring 4 pivotally engages the second housing part 2'. It will be noted that the second end 29 of the tension spring 4 is accommodated in a recess 31 disposed in the distal end 25 of the second housing part 2' in a snap-fit type of connection. A similar connection is provided between the clamp lever 3 and the distal end 23 of the first housing part 2 due to the snap-fit accommodation of the axle or pivot pin 12 (see FIG. 1a) into the recess 11 (see FIG. 2a) of the first housing part 2.

To close the housing parts 2, 2' from the open position shown in FIG. 1a to the closed position shown in FIG. 1b, the second end 27 of the clamp lever 3 is pulled downward so that the second end 27 of the clamp lever 3 moves from the position shown in FIG. 1*a* with the distal end 23 of the first housing part 2 disposed between the second end 27 of the clamp lever 3 and the distal end 25 of the second housing part 2' to the position shown in FIG. 1*b* with the second end 27 of the clamp lever 3 disposed essentially between the distal ends 23, 25 of the first and second housing parts 2, 2' respectively. It will also be noted that the tension spring 4 includes a middle section 32 that curves towards the proximate ends 22, 24 of the first and second housing parts 2, 2' respectively. This curved configuration ensures that the hollow member 1 may be inserted between the first and second housing parts 2 and 2' without interference from the spring 4. When the sensor is in the closed position shown in FIG. 1*b*, it will be noted that the disk 33 that is attached to the second end 27 of the clamp lever 3 engages the distal end 23 of the first housing part 2.

It can be seen that, in the open position (FIG. 1*a*), the plug 20 with the disk-lock 7 can be locked by means of the tension spring 4 if the plug 20 were rotated into the closed position depicted in FIG. 1*b*. In the closed position (FIG. 1*b*), the plug 20 holds primarily by means of the binding forces exerted thereupon. The common direction of rotation for the housing part 2 and the clamping lever 3 in opening and closing illustrated in FIGS. 1*a* and 1*b*.

It will be noted from FIG. 2*c* that the plug axle 34 includes a first contact area 9 and a second contact area 9'. The contact areas 9, 9' are separated by an insulating section 35 that is a part of the injection-molded plastic used to form the structure of the cable terminal 5.

FIG. 2*a* depicts the plug 21 with the snap lock 8 that snaps into the air-gap 10 and the jack plug pin 22 with the two contact areas 9 and 9' which are insulated from each other, this jack plug pin 22 serves as a plug axle 34 for the two housing parts 2, 2' pivotally joined in the articulation. The two subarticulations, or the pivotal connections between the housing part 2 and the housing part 2' as well as the pivotal connection between the plug 20 and the socket 21, separated from each other by the air gap 10 can also be seen. The cylindrical projections and depressions depicted in the two subarticulations form the auxiliary articulation, and the guide edge on the two housing parts 2, 2', recognizable in the middle of the air gap 10, serves for the axial positioning, or respectively, the maintenance of the air gap 10. A channel 11 is also clearly visible in the housing part 2, 2' into which the articulation axle or pivot pin 12 of the clamping lever 3 is clipped. Accordingly, while not shown in FIGS. 2*a*–2*e*, a channel, into which the part of the tension spring 4 serving as articulation axis is snapped, is located in housing part 2'. The metal contact surfaces contained in the articulation and serving as socket for the jack plug are likewise not shown in FIGS. 2*a*–2*e*.

Figure 3A:
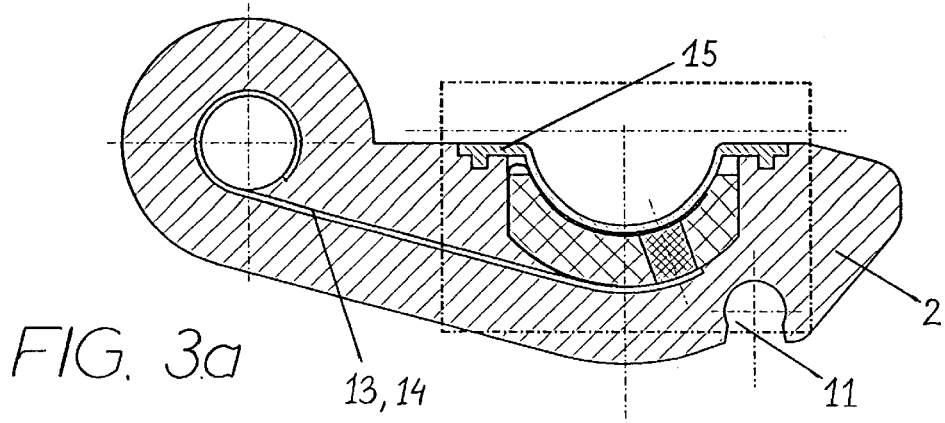
FIG. 3a is a sectional view of one housing part of the sensor shown in FIG. 1.
Figure 3B:
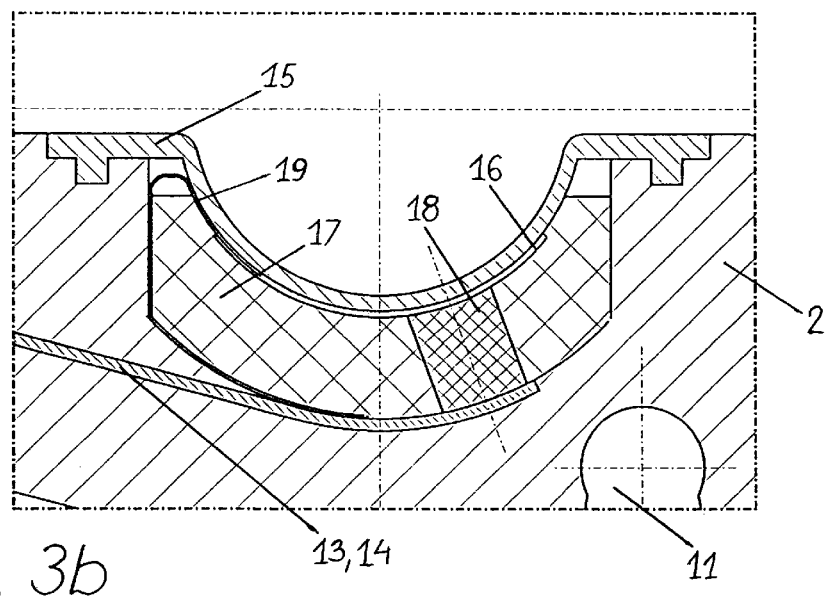
Figure 3C:
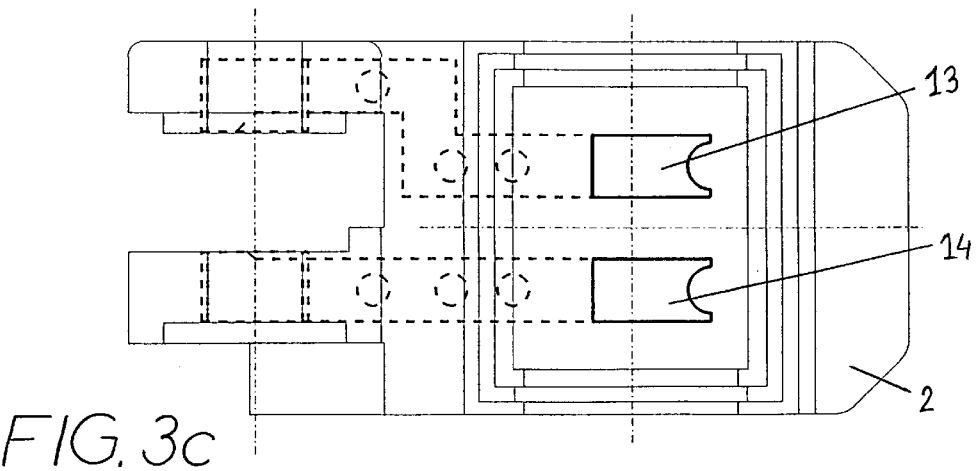

These metal parts 13 and 14, which are integrated in the housing parts 2, 2', are clearly recognizable in FIG. 3, however. Protected by the protective film 15, the measuring element 16 lies in contact with the elastic supporting element 17. An electrically conductive elastomer 18 as well as a thin metal film 19 conduct the electrical signal from the measuring element to the contact zones of the two metal parts 13 and 14, which conduct the signal in a properly poled manner to the contact surfaces, contained in the subarticulations, of the socket for the jack plug.

It is easy to see that the depicted sensor is very easy to handle; above all, the design and arrangement of the tension device enable even a one-handed operation as needed, as the sensor, together with the tension device (which remains joined as described), must simply be pushed over the injection line to be measured from the side, after which the clamping lever 3 in the depiction according to FIGS. 1*a* and 1*b* need merely be swung from the position according to FIG. 1*a* to the position according to FIG. 1*b*, which can be done with the thumb or finger. The design of the plug depicted and described also ensures and simplifies the operability, or respectively, the ease of handling of the sensor.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A sensor providing a bipolar discharge of measuring signals for measuring an internal pressure of a hollow body, the sensor comprising:

a housing comprising a first housing part and a second housing part, the first housing part comprising a proximate end and a distal end, the second housing part comprising a proximate end and a distal end, the proximate end of the first housing part and second housing part being pivotally connected, a clamp lever, a curved tension spring, the distal end of the first housing part pivotally engaging the clamp lever, the clamp lever being connected to the curved tension spring which has a first end connected to the clamp lever and a second end that pivotally engages the distal end of the second housing part with a middle portion that curves towards the pivotally connected proximate end of the first housing part and second housing part, the first housing part and second housing part each comprising inside surfaces that accommodate the first and second electric measuring elements respectively, the inside surfaces of the first housing part and second housing part being disposed between the middle portion of the tension spring and the distal ends of the first housing part and second housing part, the housing being pivotal to an open position with the inside surfaces of the first housing part and second housing part being sufficiently separated to permit insertion of the hollow body therebetween, the housing further being pivotal to a closed position with the electric measuring elements pressed elastically against the hollow body upon a pivotal movement of the clamp lever towards the distal end of the second housing part.

2. A sensor for measuring an internal pressure of a hollow body, the sensor comprising:

a housing comprising a first housing part and a second housing part, the first housing part comprising a proximate end and a distal end, the second housing part comprising a proximate end and a distal end, the proximate ends of the first housing part and second housing part being pivotally connected, a clamp lever, a curved tension spring, the distal end of the first housing part pivotally engaging a first end of the clamp lever, the clamp lever also comprising a second end, the first end of the clamp lever also being connected to the curved tension spring which has a first end connected to the first end of the clamp lever, the curved tension spring also comprising a second end that pivotally engages the distal end of the second housing part with a middle portion that curves towards the pivotally connected proximate end of the first housing part and second housing part, the first housing part and second housing part each comprising inside surfaces that accommodate said at least one electric measuring element, the inside surfaces of the first housing part and second housing part being disposed between the middle portion of the tension spring and the distal end of the first housing part and second housing part, and the housing being pivotal to an open position with the inside surfaces of the first housing part and second housing part being sufficiently separated to permit insertion of the hollow body therebetween, the first housing part being disposed between the second housing part and the second end of the clamp lever in said open position, the housing further being pivotal to a closed position with the at least one electric measuring element pressed elastically against the hollow body upon a pivotal movement of the clamp lever towards the distal end of the second housing part, the distal end of the first housing part and second housing part being disposed between the second end of the clamp lever and the proximate end of the first housing part and second housing part in said closed position.

3. The sensor of claim 2 wherein the clamp lever comprises a pivot pin and the first housing part comprises a recess for resiliently accommodating the pivot pin.

4. The sensor of claim 1 wherein the clamping lever further comprises a first end that pivotally engages the first housing part and a second end, in the open position, the distal end of the first housing part is disposed between the second end of the clamp lever and the distal end of the second housing part, in the closed position, the second end of the clamping lever is disposed between the distal ends of the first and second housing parts.

5. The sensor of claim 1 wherein the first and second electric measuring elements are separated from each other by an air gap.

6. The sensor of claim 4 further comprising a bipolar plug connection for connecting a cable to the first and second electric measuring elements, the bipolar plug connection comprising a plug axle comprising a first contact area for pivotally engaging the first electric measuring element and a second contract area for pivotally engaging the second electric measuring element, the first and second contact areas being spaced apart and separated by insulation, the plug axle pivotally connecting the bipolar plug connection to the first and second housing parts.

7. The sensor of claim 6 bipolar plug connection further comprises a projecting lock for securing the bipolar plug connection to the first and second housing parts.

8. The sensor of claim 7 the projecting lock comprises a distal end having a bead, the bead being resiliently received in a gap disposed between the proximate ends of the first and second housing parts.

9. The sensor of claim 6 wherein the bipolar plug connection further comprises a disk-shaped lock member, the disk-shaped lock member being trapped under the middle portion of the tension spring when the sensor is in the open position.

10. The sensor of claim 6 wherein the bipolar plug connection further comprises a disk-shaped lock member, the disk-shaped lock member engaging the middle portion of the tension spring if the bipolar plug connection is rotated when the sensor is in the closed position.

11. The sensor of claim 6 wherein the first and second housing parts remain connected in the event the bipolar plug connection is detached from the first and second housing parts.

12. The sensor of claim 2 wherein the at least one electric measuring element comprises a first electric measuring element accommodated on the first housing part and a second electric measuring element accommodated on the second housing part, the sensor providing a bipolar discharge of measuring signals.

13. A sensor providing a bipolar discharge of measuring signals for measuring an internal pressure of a hollow body, the sensor comprising:

a housing comprising a first housing part and a second housing part, the first housing part comprising a proximate end and a distal end, the second housing part comprising a proximate end and a distal end, the proximate end of the first housing part and second housing part being pivotally connected, a clamp lever, a curved tension spring, the distal end of the first housing part pivotally engaging the clamp lever, the clamp lever being connected to the curved tension spring which has a first end connected to the clamp lever and a second end that pivotally engages the distal end of the second housing part with a middle portion that curves towards the pivotally connected proximate end of the first housing part and second housing part, a first electric measuring element, a second electric measuring element, the first housing part comprising an inside surface that accommodates the first electric measuring element, the second housing part comprising an inside surface that accommodates the second electric measuring element, the inside surface of the first housing part and second housing part being disposed between the middle portion of the tension spring and the distal end of the first housing part and second housing part, the housing being pivotal to an open position with the inside surface of the first housing part and second housing part being sufficiently separated to permit insertion of the hollow body therebetween, the housing further being pivotal to a closed position with the first and second electric measuring element pressed elastically against the hollow body upon a pivotal movement of the clamp lever towards the distal end of the second housing part, the clamping lever further comprises a first end that pivotally engages the first housing part and a second end, in the open position, the distal end of the first housing part is disposed between the second end of the clamp lever and the distal end of the second housing part, in the closed position, the second end of the clamping lever is disposed between the distal end of the first housing part and second housing part.

14. A sensor for measuring an internal pressure of a fuel injection tube, the sensor comprising:

a housing comprising a first housing part and a second housing part, the first housing part comprising a proximate end and a distal end, the second housing part comprising a proximate end and a distal end, the proximate end of the first housing part and second housing part being pivotally connected, a clamp lever, a curved tension spring, the distal end of the first housing part pivotally engaging a clamp lever, the clamp lever being connected to the curved tension spring having a first end connected to the clamp lever and a second end that pivotally engages the distal end of the second housing part with a middle portion that curves towards that is pivotally connected to proximate end of the first housing part and second housing part, a first electric measuring element, a second electric measuring element, the first housing part comprising an inside surface that accommodates the first electric measuring element, the second housing part comprising an inside surface that accommodates the second electric measuring element, the first electric measuring element and second electric measuring element are separated from each other by an air gap, the sensor providing a bipolar discharge of measuring signals, the inside surfaces of the first housing part and second housing part being disposed between the middle portion of the tension spring and the distal ends of the first housing part and second housing part, the housing being pivotal to an open position with the inside surfaces of the first housing part and second housing part being sufficiently separated to permit the insertion of the tube therebetween, the housing further being pivotal to a closed position with the electric measuring element pressed elastically against the tube upon a pivotal movement of the clamp lever towards the distal end of the second housing part, the clamping lever further comprises a first end that pivotally engages the first housing part and a second end, in the open position, the distal end of the first housing part is disposed between the second end of the clamp lever and the distal end of the second housing part, in the closed position, the second end of the clamping lever is disposed between the distal ends of the first housing part and second housing part, the clamp lever comprises a pivot pin and the first housing part comprises a recess for resiliently accommodating the pivot pin, a bipolar plug connection for connecting a cable to the first electric measuring element and second electric measuring element, the bipolar plug connection comprising a plug axle comprising a first contact area for pivotally engaging the first electric measuring element and a second contract area for pivotally engaging the second electric measuring element, the first contact area and second contact area being spaced apart and separated by insulation, the plug axle pivotally connecting the bipolar plug connection to the first housing part and second housing part, the bipolar plug connection further comprising a projecting lock for securing the bipolar plug connection to the first housing part and second housing part, the projecting lock comprising a distal end having a bead, the bead being resiliently received in a gap disposed between the proximate ends of the first housing part and second housing part, the bipolar plug connection further comprises a disk-shaped lock member, the disk-shaped lock member being trapped under the middle portion of the tension spring when the sensor is in the open position, the first housing part and second housing part remain connected in the event the bipolar plug connection is detached from the first housing part and second housing part.

15. A sensor for measuring an internal pressure of a hollow body, the sensor comprising:

a housing comprising a first housing part and a second housing part, the first housing part comprising a proximate end and a distal end, the second housing part comprising a proximate end and a distal end, the proximate ends of the first housing part and second housing part being pivotally connected, a clamp lever, a curved tension spring, the distal end of the first housing part pivotally engaging a first end of the clamp lever, the clamp lever also comprising a second end, the clamp lever also being connected to the curved tension spring which has a first end connected to the first end of the clamp lever, the curved tension spring also comprising a second end that pivotally engages the distal end of the second housing part with a middle portion that curves towards the pivotally connected proximate end of the first housing part and second housing part, the first housing part comprising an inside surface that accommodates a first electric measuring element, the second housing part comprising an inside surface that accommodates a second electric measuring element, the inside surfaces of the first housing part and second housing part being disposed between the middle portion of the tension spring and the distal end of the first housing part and second housing part, the housing being pivotal to an open position with the inside surfaces of the first housing part and second housing part being sufficiently separated to permit insertion of the hollow body therebetween, the housing further being pivotal to a closed position with the electric measuring element pressed elastically against the hollow body upon a pivotal movement of the clamp lever towards the distal end of the second housing part, and in the open position, the distal end of the first housing part is disposed between the second end of the clamp lever and the distal end of the second housing part, in the closed position, the distal ends of the first housing part and second housing part are disposed between the proximate end of the first housing part and second housing part and the second end of the clamp lever.

16. The sensor of claim 12 wherein the clamp lever comprises a pivot pin and the first housing part comprises a recess for resiliently accommodating the pivot pin.

17. The sensor of claim 12 wherein the sensor provides a bipolar discharge of measuring signals.

18. The sensor of claim 17 wherein the first and second electric measuring elements are separated from each other by an air gap.

19. The sensor of claim 17 further comprising a bipolar plug connection for connecting a cable to the first and second electric measuring elements, the bipolar plug connection comprising a plug axle comprising a first contact area for pivotally engaging the first electric measuring element and a second contract area for pivotally engaging the second electric measuring element, the first and second contact areas being spaced apart and separated by insulation, the plug axle pivotally connecting the bipolar plug connection to the first and second housing parts.

20. The sensor of claim 19 the bipolar plug connection further comprises a projecting lock for securing the bipolar plug connection to the first and second housing parts, the projecting lock comprising a distal end having a bead, the bead being resiliently received in a gap disposed between the proximate ends of the first and second housing parts.

21. The sensor of claim 20 wherein the bipolar plug connection further comprises a disk-shaped lock member, the disk-shaped lock member being trapped under the middle portion of the tension spring when the sensor is in the open position.

22. The sensor of claim 21 wherein the first and second housing parts remain connected in the event the bipolar plug connection is detached from the first and second housing parts.

* * * * *